Patented July 1, 1941

2,248,019

UNITED STATES PATENT OFFICE 2,248,019

PROCESS OF MANUFACTURE OF STILBOESTROL AND RELATED COMPOUNDS

Louis F. Fieser, Cambridge, Mass., and Walter G. Christiansen, Glen Ridge, N. J.; said Christiansen assignor to E. R. Squibb & Sons, New York, N. Y., a corporation of New York No Drawing. Application May 17, 1940, Serial No. 335,820

7 Claims. (Cl. 260—613)

This invention relates to, and has for its object the provision of: (1) a method of preparing compounds of the general formula HO—$C_6H_4$—C(lower alkyl)=C(lower alkyl)—$C_6H_4$—OH—notably 4, 4'-dihydroxy-alpha, beta-diethyl-stilbene (stilboestrol)— and (2) a method of preparing compounds of the general formula

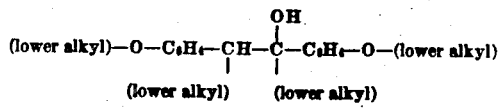

Stilboestrol is a valuable therapeutic agent, being estrogenically active. It has priorly been prepared by Dodds et al. (Nature 141, 247, 1938), but their method is unsatisfactory in that it gives poor yields.

The method of this invention essentially involves the conversions schematically represented as follows:

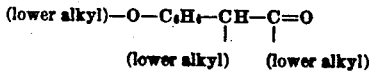

e. g., 4-(p-anisyl)-hexanone-3

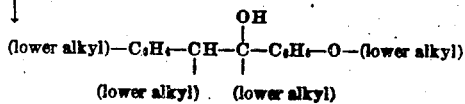

e. g., 4, 4'-dimethoxy-alpha, beta-diethyl-alpha-hydroxy-diphenylethane

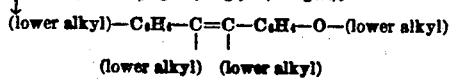

e. g., 4, 4'-dimethoxy-alpha, beta-diethyl-stilbene

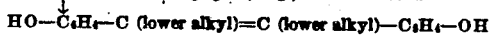

e. g., stilboestrol.

Preferably, the de-alkylation step (c) is effected by reacting with a Grignard reagent of the group consisting of $CH_3MgI$, $C_6H_5MgBr$, and $C_2H_5MgI$, as described and claimed in Braker et al. application Serial No. 275,794, filed May 26, 1939.

The invention will be explained in detail in connection with the manufacture of stilboestrol. Illustrative examples follow.

Example 1

(a) A solution of 9 g. 4-(p-anisyl)-hexanone-3 in ether is added dropwise with stirring to an ether solution of the Grignard reagent prepared from 9 g. p-bromo-anisole and 1.15 g. magnesium metal. The mixture is refluxed for two hours and treated with an iced solution of ammonium chloride; the ether layer is separated, the ether removed therefrom by distillation, and the residue subjected to steam distillation to remove byproducts of the reaction. The portion nonvolatile with steam (about 5 g.) is recrystallized from 95% ethanol to yield about 2 g. of 4, 4'-dimethoxy-alpha, beta-diethyl-alpha-hydroxy-diphenylethane, melting at 114-17° C. (uncorr.).

(b) 2 g. 4, 4'-dimethoxy-alpha, beta-diethyl-alpha-hydroxy-diphenyl-ethane and 2 cc. phosphorus tribromide are mixed and heated on a steam bath for four hours. The reaction mixture is poured into 12 cc. water with stirring, and the crude product so obtained is filtered, washed with water, and crystallized from alcohol. 4, 4'-dimethoxy-alpha, beta-diethyl-stilbene is thus obtained as a white crystalline material melting at 122-123° C.

(c) 4, 4'-dimethoxy-alpha, beta-diethyl-stilbene is demethylated by treating it with alcoholic KOH and heating in a sealed tube to 205° C.; on crystallizing from aqueous alcohol, stilboestrol is obtained as colorless plates melting at 167-168° C.

Example 2

Conversions (a) and (b) are effected as detailed in Example 1.

(c) 11.6 g. magnesium is suspended in 100 cc. ether, and a solution of 72 g. methyl iodide in 250 cc. ether is added with stirring. 60 g. 4, 4'-dimethoxy-alpha, beta-diethyl stilbene is then added, and the ether is distilled from the mixture. The residue is heated and its temperature so controlled that the reaction temperature never rises above 175° C., the operation requiring frequent removal of the source of heat; the reaction period is about an hour, during which ethane is evolved, and completion of the reaction is indicated by the cessation of evolution of ethane. The residue is decomposed with ice water and hydrochloric acid, and the material so obtained is filtered, washed with water, and dissolved in dilute sodium hydroxide solution; the alkaline solution is filtered, the filtrate acidified with hydrochloric acid, and the precipitated product filtered, washed with water, and vacuum-dried. When recrystallized from acetic acid, stilboestrol is obtained as a white crystalline material of melting point 166-168° C. (uncorr.):

Manifestly, homologs of the 4-(p-anisyl)- hexanone-3 and/or of the p-anisyl-magnesium bromide (wherein the methyl of the methoxy groups is replaced by other lower-alkyl groups, such as ethyl, propyl, or butyl) may be used in the foregoing examples to produce stilboestrol. Also, homologs of stilboestrol, i. e. compounds embodying lower-alkyl groups other than ethyl (inter alia, methyl, propyl, and butyl) in the alpha and/or beta positions, may be prepared by using the corresponding lower-alkyl-embodying reactant in place of 4-(p-anisyl)-hexanone-3 in the foregoing examples. Furthermore, the invention is obviously applicable to the production of compounds isomeric to stilboestrol and its homologs; thus, compounds wherein one or both of the hydroxy groups are in positions other than para to the linkage between the benzene nuclei may be prepared by starting with compounds correspondingly-isomeric to 4-(p-anisyl)-hexanone-3 and/or p-anisyl-magnesium bromide (or their homologs).

The invention may be variously otherwise embodied, within the scope of the appended claims.

We claim:

1. The method of preparing a compound of the general formula HO—C₆H₄—C(lower alkyl)=C(lower alkyl)—C₆H₄—OH, which comprises reacting a compound of the general formula

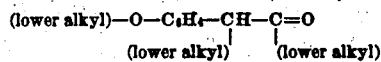

with a Grignard reagent prepared from a compound of the general formula halogen—C₆H₄—O—(lower alkyl), reacting the resulting carbinol with a dehydrating agent, and reacting the dehydration product with a de-alkylating agent.

2. The method of preparing a 4,4'-dihydroxy-alpha, beta-di-(lower alkyl)-stilbene which comprises reacting a compound of the general formula

with a Grignard reagent prepared from a compound of the general formula

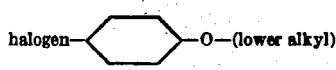

reacting the resulting carbinol with a dehydrating agent, and reacting the dehydration product with a de-alkylating agent.

3. The method of preparing stilboestrol which comprises reacting 4-(p-anisyl)-hexanone-3 with a Grignard reagent prepared from p-bromo-anisole, reacting the resulting carbinol with a dehydrating agent, and reacting the dehydration product with a de-methylating agent.

4. The method of preparing a compound of the general formula HO—C₆H₄—C(lower alkyl)=C(lower alkyl)—C₆H₄—OH, which comprises reacting a compound of the general formula

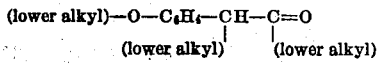

with a Grignard reagent prepared from a compound of the general formula halogen—C₆H₄—O—(lower alkyl), reacting the resulting carbinol with a phosphorus trihalide, and reacting the resulting dehydration product with a Grignard reagent of the group consisting of CH₃MgI, C₆H₅MgBr, and C₂H₅MgI.

5. The method of preparing a compound of the general formula

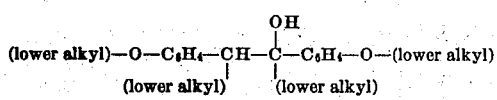

which comprises reacting a compound of the general formula

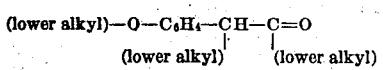

with a Grignard reagent prepared from a compound of the general formula halogen—C₆H₄—O—(lower alkyl).

6. The method of preparing a compound of the general formula

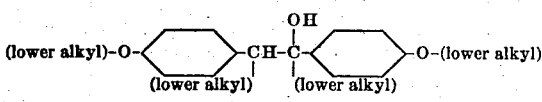

which comprises reacting a compound of the general formula

with a Grignard reagent prepared from a compound of the general formula

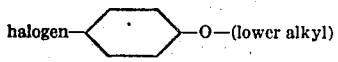

7. The method of preparing 4,4'-dimethoxy-alpha, beta-diethyl-alpha-hydroxy-diphenylethane, which comprises reacting 4-(p-anisyl)-hexanone-3 with a Grignard reagent prepared from p-bromo-anisole.

LOUIS F. FIESER.
WALTER G. CHRISTIANSEN.